Patented July 20, 1948

2,445,726

UNITED STATES PATENT OFFICE 2,445,726

PROCESS OF FORMING AND ORIENTING CRYSTALLINE RESINOUS BODIES

William H. Willert, Paterson, N. J., assignor to The Firestone Tire & Rubber Company, Akron, Ohio, a corporation of Ohio No Drawing. Application July 14, 1944, Serial No. 545,013

2 Claims. (Cl. 18—47.5)

This invention relates to the production of oriented crystalline resinous filaments, rods, sheets, tubing, hollow ware and other shaped articles from crystalline vinylidene chloride resins, and also from crystalline resinous polymers of 2,3-dichlorobutadiene-1,3. More particularly, this invention relates to the production of said resinous articles in "super-oriented" forms having extraordinarily high tensile strength and elasticity.

It is well known that the vinylidene chloride polymer resins tend to be crystalline in character, and that by suitable processing, the crystals may be oriented in a single direction or plane. Resins which have ben oriented in this manner are characterized by a high degree of tensile strength, flexibility, and elasticity in the direction of crystal orientation. Processes heretofore developed for the purpose of effecting such orientation all depend upon the phenomenon whereby vinylidene chloride resins, when rapidly quenched from the molten state, assume a metastable amorphous form. Mechanical deformation of this amorphous form causes it to instantly crystallize in an oriented pattern in which the crystals become more or less aligned in the direction of the mechanical deformation. Such oriented polyvinylidene chloride resins have tensile strengths on the order of 30,000 pounds per square inch in the direction of crystal orientation, and in this respect are far superior to most other plastic resins; however they are somewhat inferior in tensile strength to the nylon resins, which frequently have tensile strengths on the order of 90,000 pounds per square inch. Moreover the conventional orientation process above outlined is inapplicable to the production of articles of massive cross section, since it is impractical to quench such articles rapidly enough to obtain the resin in uniformly amorphous state. Resins which are not rapidly quenched assume a crystalline state in which the crystals are oriented at random, and in this state cannot be deformed under ordinary conditions to produce oriented crystallinity. Thus it is impossible to develop the property of crystalline orientation in many plastic articles in which the resultant enhanced strength and flexibility would be highly desirable; for instance it would be highly desirable to enhance the tensile strength and flexibility of heavy piping, rods, shafting, and heavy molded mechanical components made from vinylidene chloride resins, but this desirable result has not been obtained in practice, due to the difficulty of rapidly quenching such heavy articles. In fact, massive articles of oriented vinylidene chloride, by which is meant articles having all dimensions greater than about one eighth inch, do not seem heretofore to have been obtained by any process.

It is known that oriented vinylidene chloride fibers produced in the conventional way may be "super-oriented" by further stretching at "super-stretch" temperatures, defined as being temperatures between the softening points of the particular fibers under treatment, and 50° C. below these temperatures. Fibers so treated have tensile strengths on the order of 60,000–90,000 pounds per square inch, and are thus fully competitive with nylon fibers. However, this process, being dependent upon the conventional process of producing oriented vinylidene chloride resins by supercooling and stretching, is inapplicable to the production of objects of heavy cross-section. Likewise, this process, since it entails two separate stretching steps, is undesirably complicated, as will appear more fully when compared to the process of this invention.

Accordingly it is an object of this invention to provide oriented vinylidene chloride polymeric resins of enhanced tensile properties.

Another object is to dispense with the supercooling step conventionally practiced in the production of articles from oriented vinylidene chloride polymeric resins.

Another object is to prepare massive objects of vinylidene chloride polymer resins in oriented crystalline form.

Still another object is to prepare crystalline resinous polymers of 2,3-dichlorobutadiene-1,3. in super-oriented form.

The above and other objects are attained in accordance with this invention by forming a body of vinylidene chloride resin, or of a highly crystalline 2,3-dichlorobutadiene-1,3 resinous polymer which will be described more fully hereinafter; causing the body to crystallize with random orientation of the crystals thereof; adjusting the temperature of the body to the "super-stretch" range, i. e., temperatures between the softening temperature of the resin and 50° C. below that temperature; and mechanically deforming the body in one or more directions. The crystals in the resinous body thereby become re-oriented and aligned in the direction of deformation of the resinous body, with concomitant development of high tensile strength and elasticity in said direction. If the deformation is carried far enough, the resinous body will attain a tensile strength in the range of 60,000 to 90,000 pounds per square inch, and will have other properties of elasticity, resilience and the like comparable to the properties of nylon resins. In contrast to the process in which a resinous polymer is first oriented from the supercooled state and thereafter further oriented at elevated "super-stretch" temperatures, the process of this invention requires only a single stretching step, rather than two separate stretching steps. Moreover the present invention may be carried out without the rapid quenching of the molten resin required to obtain the amorphous form thereof: the process of this invention may therefore be carried out upon resinous objects of relatively heavy cross section, a result not hitherto attainable in any practical way.

Referring to the vinylidene chloride polymer resins which may be converted into oriented and super-oriented forms in accordance with the practice of this invention, these may be any of the very well known commercial products sold under the names of "Velon" (trade name of The Firestone Tire and Rubber Company) and "Saran." As they appear upon the market, these resins are usually copolymers of vinylidene chloride with minor proportions of vinyl chloride. However, the unmodified vinylidene chloride resins, or resinous copolymers of vinylidene chloride with minor proportions of other unsaturates such as vinyl acetate, styrene, acrylic and methacrylic esters, butadienes, acrylonitrile, and the like, capable of crystallization and orientation, may similarly be used.

The process of this invention is likewise applicable to certain highly crystalline resinous polymers and copolymers of 2,3-dichlorobutadiene-1,3. Monomeric 2,3-dichlorobutadiene-1,3 polymerizes very readily to yield resins which, unless special techniques are observed, will not have any pronounced crystalline tendencies. However if the polymerization of 2,3-dichlorobutadiene-1,3 or mixtures thereof with minor proportions of other compounds copolymerizable therewith is carried out in the presence of "modifiers" such as the alkyl mercaptans, thiophenols, and the like, there may be obtained resins which exhibit the phenomena of supercooling, crystallization by aging or mechanical deformation, etc. substantially identical with the phenomena observed in connection with vinylidene chloride polymer resins. These highly crystalline 2,3-dichlorobutadiene-1,3 resins may likewise be obtained by the restrained chlorination of relatively non-crystalline polymers of 2,3-dichlorobutadiene-1,3. All such highly crystalline resinous polymers and copolymers of 2,3-dichlorobutadiene-1,3 are amenable to the process of this invention.

As noted above, preliminarily to the orientation process of this invention, the resin is initially worked up into a preform of a shape suitable for subsequent mechanical deformation into the shape of the desired finished article. Thus the resin may be extruded to form a filament, a heavy rod, or a shaped section which may later be stretched or diebench drawn to effect orientation; or the resin may be cast into the form of a block which may later be rolled to orient the resin; or the resin may be worked into the form of a sheet or partially-shaped blank which may subsequently be punchdrawn, pressed, blown, spun, etc. to final shape.

After the resin preform has been made, precautions are taken to insure that the resin therein is converted to the random-oriented crystalline state. This conversion is necessary in order that the preform will have a degree of strength enabling it to withstand handling at the elevated superstretching temperature. Likewise the preliminary random-oriented crystallization insures homogeneity of the resin when it is heated to the superstretch range; for instance, if the resin was initially in the supercooled amorphous state and was then heated to the superstretch range, crystallization would immediately set in, and if not completed at the time of the mechanical deformation, would result in such inhomogeneity of the resin as to preclude effective working thereof. The conversion may be effected by allowing the preform to stand at a suitable temperature until random crystallization has occurred. Preferably, the conversion is effected at somewhat elevated temperatures on the order of 30° C. up to the "superstretch" temperature range, i. e. from 30° C. up to within about 50 centigrade degrees below the softening point of the resin, as the crystallization takes place quite rapidly under these conditions; however an appreciable conversion occurs even at lower temperatures, such as room temperature or even lower, providing sufficient time is allowed. For some obscure reason, crystallization does not proceed rapidly in the "superstretch" temperature range, although, since the crystalline state of the resin appears to be thermodynamically stable in this range, it would be expected that even more rapid crystallization would occur at high temperatures. It is believed possible that this phenomenon is due to the fact that the resin is not truly a one component system, due to the varying molecular weight of the polymeric chains, and also to the fact that the resin is in many cases a copolymer, and hence the molecular species might be considered to vary from point to point even along a single polymeric chain.

Following the step of converting the resin preform to the random-oriented crystalline state, the temperature of the preform is adjusted to the "superstretch" range, i. e., temperatures between the softening point of the resin and 50° C. therebelow. The preform is then mechanically deformed as by stretching, die-drawing, punching, swaging, spinning, rolling, blowing and the like, depending upon the physical form of the article to be made, whereupon the resin of which the article is composed becomes oriented and attains a substantially increased degree of tensile strength. If the deformation is carried out to a sufficient degree, for instance if any dimension of the article is increased by 7 or 8 fold, the resin is converted into a superstretched state having exceedingly high tensile strength, on the order, in some cases, of about 60,000–90,000 pounds per square inch. The final tensile properties of resins treated in this manner are substantially the same as those of the resins which have been initially oriented from the super-cooled state and have thereafter been further oriented at "super-stretch" temperatures; however the present invention has the advantage that the preliminary quenching, and the first stretching step may be dispensed with, thus providing a much simpler process. Also, since the process of this invention does not require the initial formation of a quenched amorphous resin, the present invention for the first time makes it possible to obtain massive objects of oriented crrystalline vinylidene chloride resins.

With the foregoing general discussion in mind, there are given herewith detailed examples of the practice of this invention.

Example I

A copolymer of 85% vinylidene chloride and 15% vinyl chloride having a softening point of 135° C. was melted and extruded at 180° C. directly into a water bath at 60° C. to form a filament .027" in diameter. The filament was passed over an advancing reel in the bath so that its dwell in the bath was on the order of 30 seconds, to insure complete random crystallization of the filament. The filament was then passed to a second bath containing glycerine at 120° C., and stretched to 7 times its original length by means of stretching rolls immersed in this bath. Upon cooling, the filament had a tensile strength of 78,000 pounds per square inch with an elongation of 11% at break. The filament approached to true elasticity, having only very slight permanent elongation under stress. The filament likewise was much more resilient than vinylidene chloride fibers prepared in the usual way, and on this account it was especially suitable for use as a synthetic bristle.

Example II

| | Parts |
|---|---|
| 2,3-dichlorobutadiene-1,3 | 100 |
| Methanol | 300 |
| Water | 100 |
| Lauryl mercaptan | 0.84 |
| Lauryl alcohol | 2.0 |

The above ingredients were agitated at 38° C. for 16 hours. Upon cessation of agitation, a resinous polymer was filtered off from the polymerization mass and washed with water. The resultant resin, which had a softening point of about 140° C. was processed exactly as was the vinylidene chloride copolymer of Example I, yielding a filament having a tensile strength of 60,000 pounds per square inch.

Example III

A copolymer of 85% vinylidene chloride and 15% vinyl chloride having a softening point of 135° C. was extruded and relatively slowly cooled to form a random crystallized rod ¼" in diameter. One end of the rod was attached to the inside of the roof of an oven, and a 120-pound weight was hung from the other end of the rod. The oven was heated to 110° C., whereupon the rod elongated to about 7 times its original length. When cooled, the rod had a tensile strength of 60,000 pounds per square inch.

Example IV

A plaque 6" x 6" x 3/16" was molded in a compression mold from a resinous copolymer of 85% vinylidene chloride and 15% vinyl chloride having a softening point of 135° C. The mold was slowly cooled before removal of the plaque, which accordingly was uniformly crystallized with random orientation of the crystals. The plaque was heated to 130° C. and spun into a tapered cup 4" deep. The finished cup was in the oriented crystalline state, and coupons cut therefrom exhibited tensile strengths ranging from 25,000 to 35,000 pounds per square inch. The tensile strength of unoriented vinylidene chloride resins is about 4,000 pounds per square inch.

From the foregoing general description and detailed examples, it will be seen that this invention provides novel and simplified means for the production of oriented fibers and other objects from resinous polymers and copolymers of vinylidene chloride and of 2,3-dichlorobutadiene-1,3. Likewise, the process makes possible, for the first time, the production of these resins in oriented form in heavy sections such as rods, pipes, architectural and like extruded sections, dished articles, mechanical components, plates, and the like.

What is claimed is:

1. Process which comprises extruding a preform having all dimensions greater than one-eighth inch of a resin selected from a group consisting of crystallizable polymers and copolymers of a vinylidene chloride and of 2,3-dichlorobutadiene-1,3, retaining the preform at such temperatures and for such duration of time as to effect random-oriented crystallization of the resin of which it is composed, and stretching said preform to from 7 to 8 times its original dimension at temperatures between the softening point of the selected resin and 50° C. below said softening point.

2. Process which comprises extruding a preform having all dimensions greater than one-eighth inch of a crystalline resinous copolymer of vinylidene chloride, retaining the preform at such temperatures and for such periods of time as to effect random-oriented crystallization of the resin of which it is composed, and stretching said preform to from 7 to 8 times its original dimension at temperatures between the softening point of said resin and 50° C. below said softening point.

WILLIAM H. WILLERT.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,160,904 | Reilley et al. | June 6, 1939 |
| 2,160,931 | Wiley | June 6, 1939 |
| 2,176,091 | McClurg et al. | Oct. 3, 1939 |
| 2,244,208 | Miles | June 3, 1941 |
| 2,344,511 | Harder | Mar. 21, 1944 |